US 12,352,653 B2

(12) United States Patent
Kinoshita et al.

(10) Patent No.: US 12,352,653 B2
(45) Date of Patent: Jul. 8, 2025

(54) BEARING DIAGNOSIS APPARATUS, BEARING DIAGNOSIS METHOD, AND COMPUTER READABLE RECORDING MEDIUM

(71) Applicant: NEC Corporation, Tokyo (JP)

(72) Inventors: Shohei Kinoshita, Tokyo (JP); Shigeru Kasai, Tokyo (JP); Yu Kiyokawa, Tokyo (JP)

(73) Assignee: NEC CORPORATION, Tokyo (JP)

( * ) Notice: Subject to any disclaimer, the term of this patent is extended or adjusted under 35 U.S.C. 154(b) by 981 days.

(21) Appl. No.: 17/435,486

(22) PCT Filed: Jan. 16, 2020

(86) PCT No.: PCT/JP2020/001378
§ 371 (c)(1),
(2) Date: Sep. 1, 2021

(87) PCT Pub. No.: WO2020/179242
PCT Pub. Date: Sep. 10, 2020

(65) Prior Publication Data
US 2022/0136929 A1    May 5, 2022

(30) Foreign Application Priority Data
Mar. 5, 2019  (JP) .................. 2019-040050

(51) Int. Cl.
*G01M 13/04* (2019.01)
*E01D 19/04* (2006.01)

(52) U.S. Cl.
CPC ............. *G01M 13/04* (2013.01); *E01D 19/04* (2013.01)

(58) Field of Classification Search
CPC ...... G01M 13/04; G01M 13/045; E01D 19/04; E01D 19/041; E01D 19/048; E01D 22/00; F16F 15/04; G01L 5/00
See application file for complete search history.

(56) References Cited

U.S. PATENT DOCUMENTS 8,618,934 B2 * 12/2013 Belov ................ G01M 5/0008
                                                      307/151
8,790,013 B2 *  7/2014 Reedman ............. G01M 13/04
                                                      384/448

(Continued)

FOREIGN PATENT DOCUMENTS

JP    2014-173313 A     9/2014
JP    2016-050404 A     4/2016

(Continued)

OTHER PUBLICATIONS

Grimmelsman, Kirk A. "Dynamic Characterization of a Prestressed Concrete Bridge by Strain and Acceleration Measurements." Dynamics of Civil Structures, vol. 2. Switzerland: Springer International Publishing AG, 2018. 279-287. Web. (Year: 2018).*

(Continued)

*Primary Examiner* — Giovanni Astacio-Oquendo
*Assistant Examiner* — Martin Walter Braunlich (57) ABSTRACT

A bearing diagnosis apparatus 1 that accurately diagnoses the state of a bearing includes: an extraction unit 2 configured to extract a feature amount using first index information indicating a response of a structure 21 to an external force and second index information indicating a response, to the external force, of a bearing 23 provided to the structure 21; and an assessment unit 3 configured to assess the state of the bearing 23 based on the extracted feature amount.

5 Claims, 6 Drawing Sheets

(56) References Cited

U.S. PATENT DOCUMENTS

| | | | |
|---|---|---|---|
| 11,790,511 B2 * | 10/2023 | Ohta | G06T 7/0004 |
| | | | 382/141 |
| 2018/0106323 A1 * | 4/2018 | Allred | B64C 27/35 |
| 2018/0142734 A1 * | 5/2018 | Gai | F16C 23/043 |
| 2019/0243935 A1 * | 8/2019 | Yi | G01M 5/0008 |

FOREIGN PATENT DOCUMENTS

| | | |
|---|---|---|
| JP | 2018-072126 A | 5/2018 |
| JP | 2018-179881 A | 11/2018 |
| KR | 2011-0113820 A | 10/2011 |

OTHER PUBLICATIONS

English translation of Written opinion for PCT Application No. PCT/JP2020/001378, mailed on Mar. 24, 2020, found on global dossier.

International Search Report for PCT Application No. PCT/JP2020/001378, mailed on Mar. 24, 2020, found on global dossier.

Hidehiko Sekiya et al., "Soundness Evaluation of Bridge Bearing Based on Two Places Displacement Measurement Using MEMS Accelerometers", Journal of Japan Society of Civil Engineers, Ser.A2, vol. 73, No. 2 (Journal of Applied Mechanics vol. 20), 2017, pp. 1_649-1_660.

* cited by examiner

BEARING DIAGNOSIS APPARATUS, BEARING DIAGNOSIS METHOD, AND COMPUTER READABLE RECORDING MEDIUM

This application is a National Stage Entry of PCT/JP2020/001378 filed on Jan. 16, 2020, which claims priority from Japanese Patent Application 2019-040050 filed on Mar. 5, 2019, the contents of all of which are incorporated herein by reference, in their entirety.

TECHNICAL FIELD

The present invention relates to a bearing diagnosis apparatus and bearing diagnosis method for diagnosing bearings, and further relates to a computer readable recording medium that includes recorded thereon a program for realizing the bearing diagnosis apparatus and bearing diagnosis method.

BACKGROUND ART

Bearings provided in bridges are members that are installed to absorb rotation and expansion/contraction of a bridge superstructure caused by changes in temperature, etc., and to improve earthquake resistance. Furthermore, the bearings are members that absorb deformation of the superstructure, which includes a bridge girder, floor slab, etc., and transmits a force generated in the superstructure to a substructure, which includes a bridge support, foundation, etc., without directly joining the superstructure and the substructure.

Incidentally, in maintenance and management of bridges, there is a demand for a method for accurately diagnosing bearing damage. For example, Non-Patent Document 1 discloses a method for diagnosing the soundness of a bearing based on a ratio between the displacement amount of the span center of a bridge girder and the displacement response of the bearing.

LIST OF RELATED ART DOCUMENTS

Non-Patent Document

Non-Patent Document 1: Hidehiko SEKIYA, Takeshi KINOMOTO, Masayuki TAI, Yusuke KOTO, Osamu MARUYAMA, and Chitoshi MIKI, "SOUNDNESS EVALUATION OF BRIDGE BEARING BASED ON TWO PLACES DISPLACEMENT MEASUREMENT USING MEMS ACCELEROMETERS", Journal of Japan Society of Civil Engineers, Ser. A2, Vol. 73, No. 2 (Journal of Applied Mechanics Vol. 20), I_649-I_660, 2017

SUMMARY

Technical Problems

However, with the method disclosed in Non-Patent Document 1, the presence/absence of bearing damage can be erroneously diagnosed if the method is applied to a bridge in which the displacement amount of the span center of the bridge girder is small. This is because it is difficult to monitor a change in the ratio between the displacement amount of the span center of the bridge girder and the displacement response of the bearing if the displacement amount of the span center of the bridge girder is small.

An example object of the invention is to provide a bearing diagnosis apparatus, a bearing diagnosis method, and a computer readable recording medium for accurately diagnosing the state of a bearing.

Solution to the Problems

In order to achieve the above-described object, a bearing diagnosis apparatus according to an example aspect of the invention includes:

an extraction unit configured to extract a feature amount using first index information indicating a response of a structure to an external force and second index information indicating a response, to the external force, of a bearing provided to the structure; and an assessment unit configured to assess the state of the bearing based on the extracted feature amount.

In addition, in order to achieve the above-described object, a bearing diagnosis method according to an example aspect of the invention includes:

an extraction step of extracting a feature amount using first index information indicating a response of a structure to an external force and second index information indicating a response, to the external force, of a bearing provided to the structure; and an assessment step of assessing the state of the bearing based on the extracted feature amount.

Furthermore, in order to achieve the above-described object, a computer readable recording medium according to an example aspect of the invention includes recorded thereon a program including instructions that causes a computer to carry out:

an extraction step of extracting a feature amount using first index information indicating a response of a structure to an external force and second index information indicating a response, to the external force, of a bearing provided to the structure; and an assessment step of assessing the state of the bearing based on the extracted feature amount.

Advantageous Effects of the Invention

As described above, according to the invention, the state of a bearing can be accurately diagnosed.

EXAMPLE EMBODIMENT

Example Embodiment

In the following, an example embodiment of the invention will be described with reference to FIGS. 1 to 6.

[Apparatus Configuration]

Figure 1:
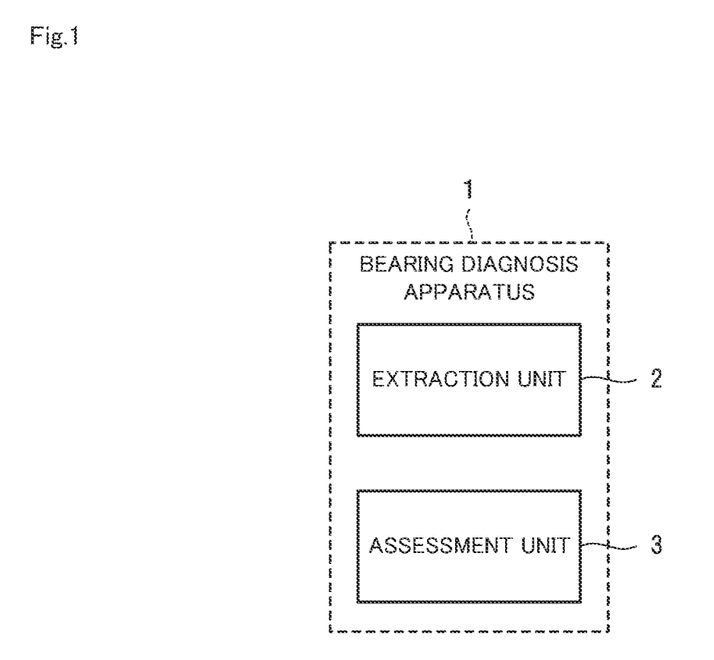
FIG. 1 is a diagram illustrating one example of a bearing diagnosis apparatus.

First, a configuration of a bearing diagnosis apparatus 1 in the present example embodiment will be described with reference to FIG. 1. FIG. 1 is a diagram illustrating one example of the bearing diagnosis apparatus.

The bearing diagnosis apparatus 1 illustrated in FIG. 1 is an apparatus for accurately diagnosing the state of a bearing. Furthermore, as illustrated in FIG. 1, the bearing diagnosis apparatus 1 includes an extraction unit 2 and an assessment unit 3.

Of the two units, the extraction unit 2 extracts a feature amount using first index information indicating a response of a structure to an external force and second index information indicating a response, to the external force, of a bearing provided to the structure. The assessment unit 3 assesses the state of the bearing based on the extracted feature amount.

Here, the structure is a hardened material (concrete, mortar, or the like) that is solidified using at least sand, water, and cement, metal, or a structure constructed using such materials, for example. Also, the structure forms the entirety or part of an architectural structure. Furthermore, the structure forms the entirety or part of a machine. For example, the external force is a live load, etc., applied to the structure.

For example, the first index information is an index indicating an acceleration response calculated using acceleration measured by a first sensor provided to the structure. For example, the second index information is an index indicating a displacement response calculated using displacement measured by a second sensor provided to the bearing.

The feature amount is information indicating the correlation between the first index information and the second index information. For example, as the information indicating the correlation, it is conceivable to use of the slope of a regression line in a distribution of the first index information and the second index information, etc.

In such a manner, in the present example embodiment, the state of a bearing can be accurately diagnosed because the response of a structure to an external force and the response of the bearing to the external force are measured, a feature amount is calculated using information indicating the correlation between the measured responses, and the state of the bearing is assessed based on the calculated feature amount. Thus, erroneous assessments can be reduced.

[System Configuration]

Next, the configuration of the bearing diagnosis apparatus 1 in the present example embodiment will be described in detail with reference to FIGS. 2, 3, and 4. Note that, in the present example embodiment, description is provided in regards to the target construction being a bridge.

Figure 2:
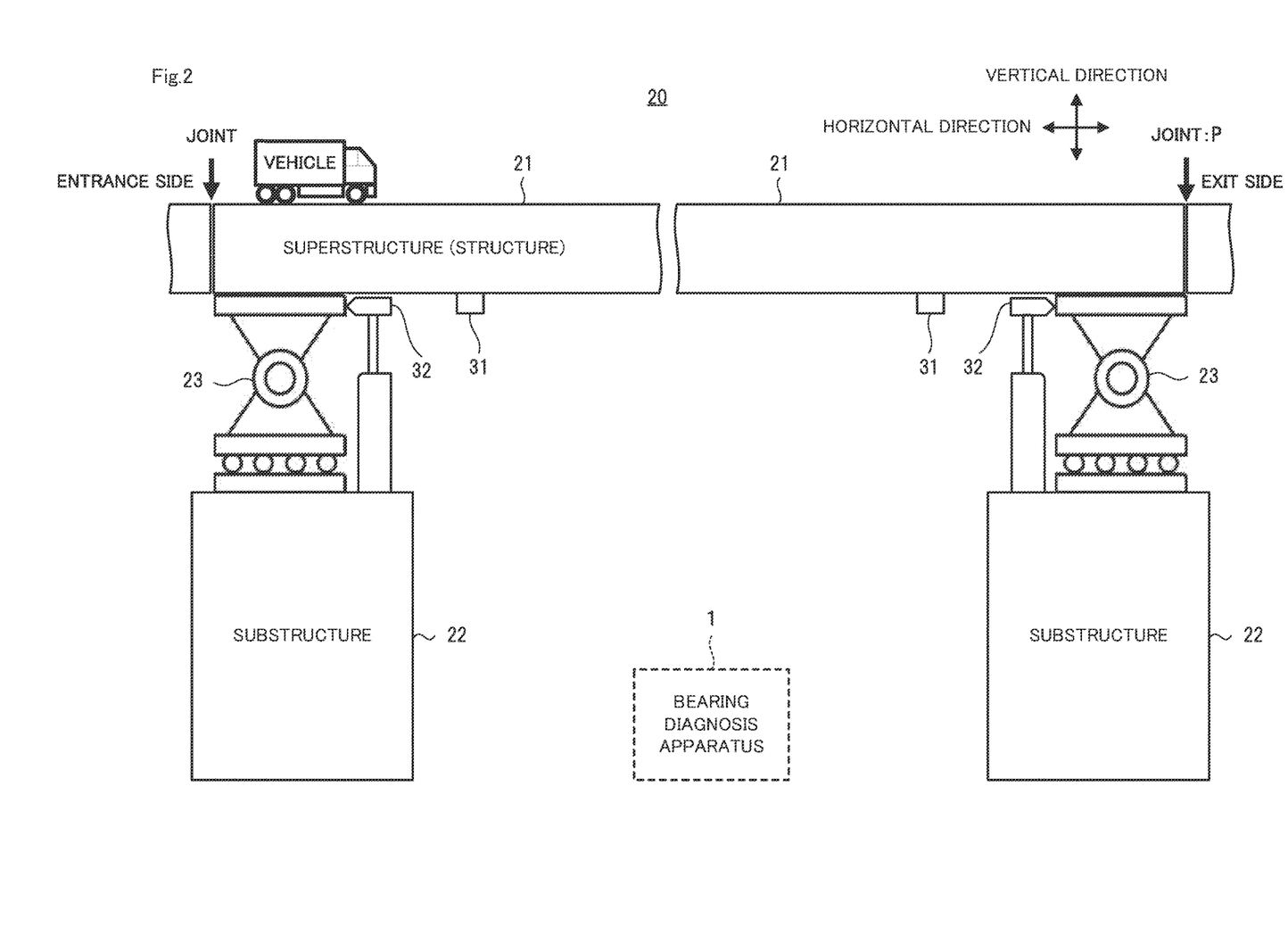
FIG. 2 is a diagram illustrating one example of a relationship between a structure and bearings

FIG. 2 is a diagram illustrating one example of a relationship between a structure and bearings. A bridge 20 illustrated in FIG. 2 includes a superstructure 21 (structure), a substructure 22, and bearings 23.

For example, the bridge 20 is a construction that is provided above a road, a railway, a canal, or the like and is used to cross such obstacles. Furthermore, the bridge 20 is a bridge with bearings, such as a girder bridge, a truss girder bridge, an arch bridge, a rigid-frame bridge, a cable-stayed bridge, or a suspension bridge, for example.

In the bridge 20 illustrated in FIG. 2, vibration is applied to the superstructure 21 one or more times by causing a vehicle to travel over the superstructure 21 multiple times from an entrance side to an exit side, for example. Furthermore, when the vehicle passes over a joint P in the example in FIG. 2, the superstructure 21 vibrates due to impact being applied to the superstructure 21 with the joint P serving as a fulcrum.

Note that, while an example of a case in which the vehicle enters the superstructure 21 is illustrated in FIG. 2, the vehicle similarly passes over a joint P and causes the superstructure 21 to vibrate due to impact being applied to the superstructure 21 also in a case in which the vehicle exits the superstructure 21.

The vehicle is an apparatus used to apply vibration to the superstructure 21. However, the apparatus for applying vibration is not limited to a vehicle. For example, the apparatus for applying vibration may be a vibration generator that is prepared in advance. Alternatively, vibration may be applied by dropping a weight that is prepared in advance. However, there is no limitation to the above-described methods.

The superstructure 21 (structure) is a structure of the bridge 20 that crosses over an obstacle. The superstructure 21 includes the bridge girder and floor slab of the bridge 20. The substructure 22 is a structure supporting the superstructure 21, and includes the bridge support and foundation, etc.

The bearings 23 are installed between the superstructure 21 and the substructure 22, and are mechanisms for transmitting the load of the superstructure 21 to the substructure 22. The bearings 23 are fixed bearings or movable bearings. Furthermore, the bearings 23 are not limited to pin bearings, and may be line bearings, bearing plate shoes, pivot bearings, roller bearings, etc., for example.

Figure 3:
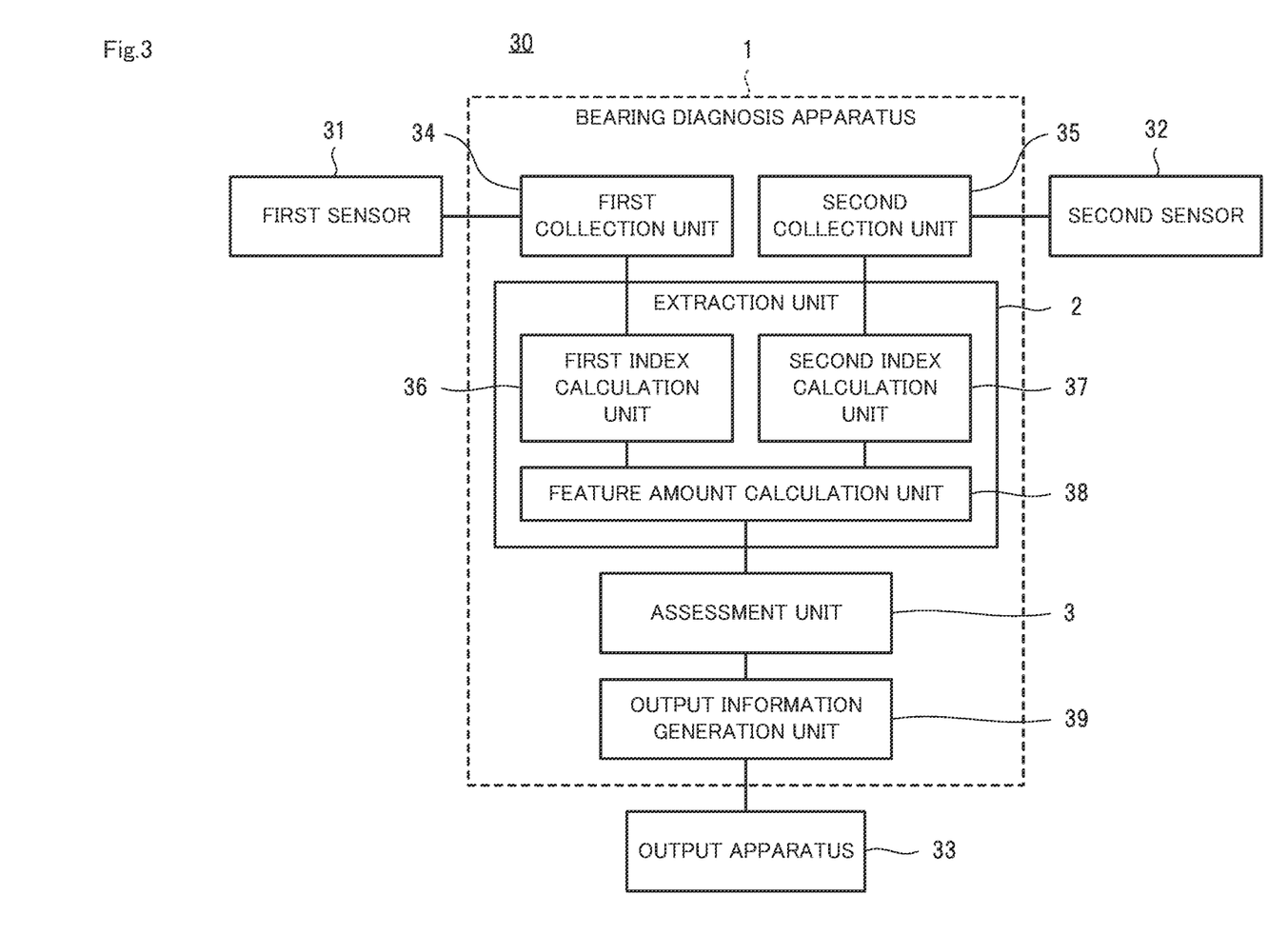
FIG. 3 is a diagram illustrating one example of a system including the bearing diagnosis apparatus.

FIG. 3 is a diagram illustrating one example of a system including the bearing diagnosis apparatus. As illustrated in FIG. 3, the system including the bearing diagnosis apparatus 1 in the present example embodiment includes a first sensor 31, a second sensor 32, and an output apparatus 33, in addition to the bearing diagnosis apparatus 1. The bearing diagnosis apparatus 1 includes a first collection unit 34, a second collection unit 35, and an output information generation unit 39, in addition to the extraction unit 2 and the assessment unit 3. Furthermore, the extraction unit 2 includes a first index calculation unit 36, a second index calculation unit 37, and a feature amount calculation unit 38.

The first sensor 31 is a sensor that is provided to the superstructure 21 and that is for measuring acceleration occurring in the superstructure 21. Specifically, as illustrated in FIG. 2, the first sensor 31 is installed to the superstructure 21, and is installed at a position that is separated from the position of a bearing 23 or the second sensor 32 by a predetermined distance so that the first sensor 31 does not come in contact with the bearing 23 and the second sensor 32. For the first sensor 31, it is conceivable to use a triaxial acceleration sensor, a fiber sensor, or the like, for example.

Furthermore, the first sensor 31 transmits, to the first collection unit 34, a signal including information indicating the measured acceleration. Note that wired or wireless communication or the like is used for the communication between the first sensor 31 and the first collection unit 34.

The second sensor 32 is a sensor for measuring the displacement of the bearing 23. Specifically, as illustrated in FIG. 2, the second sensor 32 is installed to the substructure 22. The second sensor 32 is a displacement sensor for measuring the displacement in the horizontal or vertical direction, or the displacement in both the horizontal and vertical directions. For the displacement sensor, it is conceivable to use a contact or non-contact sensor, for example.

Furthermore, the second sensor 32 transmits, to the second collection unit 35, a signal including information indicating the measured displacement. Note that wired or wireless communication or the like is used for the communication between the second sensor 32 and the second collection unit 35.

The output apparatus 33 acquires output information, which has been converted into a format that can be output by the output information generation unit 39, and outputs images, sounds, etc., generated based on the output information. For example, the output apparatus 33 is an image display device in which liquid crystal, organic electroluminescence (EL), or a cathode ray tube (CRT) is used, etc. Furthermore, the image display device may include an audio output device such as a speaker. Note that the output apparatus 33 may be a printing device such as a printer. The output information will be described later.

The bearing diagnosis apparatus 1 will be described with reference to FIG. 4. FIG. 4 is a diagram for describing the calculation of a feature amount.

The first collection unit 34 collects acceleration information indicating acceleration from the first sensor 31. Specifically, each time an event occurs, the first collection unit 34 receives acceleration information indicating acceleration occurring in the superstructure 21 due to an external force. Note that, in an event, an impact is applied to the superstructure 21 and vibration is generated in the superstructure 21. Acceleration information is information in which acceleration measured by the first sensor 31 is stored in time series. An image of acceleration information is shown in graph 41 in FIG. 4.

Subsequently, the first collection unit 34 stores the acceleration information to a storage unit so as to be associated with information indicating an event. The storage unit may be provided in the bearing diagnosis apparatus 1 or outside the bearing diagnosis apparatus 1. The information indicating an event is an event period, and is information indicating the year, month, date, and time of the start and end of an event, for example.

The second collection unit 35 collects displacement information indicating displacement from the second sensor 32. Specifically, each time an event occurs, the second collection unit 35 receives displacement information indicating displacement occurring in the bearing 23 due to an external force. Subsequently, the second collection unit 35 stores the displacement information to the storage unit so as to be associated with information indicating an event. In such a manner, information indicating an event, acceleration information, and displacement information can be stored so as to be associated with each other. An image of displacement information is shown in graph 42 in FIG. 4.

The extraction unit 2 will be described.

The first index calculation unit 36 calculates first index information (index value of external force) indicating an acceleration response using acceleration information. Specifically, first, the first index calculation unit 36 acquires acceleration information from the first collection unit 34. Subsequently, the first index calculation unit 36 calculates a root mean square (RMS) value within a predetermined period using the acceleration information, for example, and sets the RMS value as first index information.

Alternatively, the first index calculation unit 36 detects the maximum amplitude value within the predetermined period using the acceleration information, and sets the maximum amplitude value as first index information. Alternatively, the first index calculation unit 36 performs double integration using the acceleration information within the predetermined period and detects the maximum amplitude value from the result of the double integration, and sets the maximum amplitude value as first index information. However, the method to be used to calculate first index information is not limited to those described above.

Subsequently, the first index calculation unit 36 stores the first index information to the storage unit so as to be associated with information indicating an event. The predetermined period for calculating first index information is to be determined through experimentation, simulation, or the like, for example.

The second index calculation unit 37 calculates second index information indicating a displacement response using displacement information. Specifically, first, the second index calculation unit 37 acquires displacement information from the second collection unit 35. Subsequently, the second index calculation unit 37 detects the maximum amplitude value within a predetermined period using the displacement information, for example, and sets the maximum amplitude value as second index information. However, the method to be used to calculate second index information is not limited to that described above.

Subsequently, the second index calculation unit 37 stores the second index information to the storage unit so as to be associated with information indicating an event. The predetermined period for calculating second index information is to be determined through experimentation, simulation, or the like, for example.

The feature amount calculation unit 38 extracts a feature amount indicating the correlation between first index information and second index information using first index information and second index information. Specifically, first, the feature amount calculation unit 38 acquires first index information from the first index calculation unit 36. Furthermore, the feature amount calculation unit 38 acquires second index information from the second index calculation unit 37.

Subsequently, the feature amount calculation unit 38 calculates a feature amount based on generated distribution information and reference distribution information. Specifically, the feature amount calculation unit 38 calculates a feature amount using (1) the slope of a regression line, (2) coefficients of a fitting function, (3) errors from the fitting function, or the like.

The reference distribution information is distribution information that is generated from first index information and second index information serving as references and that is used as a reference when a feature amount is calculated. For example, the reference distribution information is generated through experimentation, simulation, or the like. Alternatively, the reference distribution information is generated from acceleration information and displacement information collected during a reference period.

(1) A case in which the slope of a regression line is used will be described.

The feature amount calculation unit 38 executes regression analysis processing using the generated distribution information, and calculates the slope r of the regression line. Furthermore, the feature amount calculation unit 38 executes regression analysis processing using the reference distribution information, and calculates the reference slope rb of the regression line. Note that the reference slope rb may be calculated in advance and stored to the storage unit.

Subsequently, the feature amount calculation unit 38 calculates the amount or rate of change of the slope r relative to the reference slope rb, and sets the result of the calculation as a feature amount.

(2) A case in which coefficients of a fitting function are used will be described.

The feature amount calculation unit 38 calculates an index based on information regarding a fitting function fitted using the generated distribution information and information regarding a reference fitting function fitted using the reference distribution information.

Specifically, the feature amount calculation unit 38 first calculates a fitting function that fits the distribution information. For example, a polynomial function or the like is used as the fitting function. Note that, as the method for generating the above-described fitting function, it is conceivable to use the least-squares method, the maximum likelihood estimation method, etc.

Subsequently, the feature amount calculation unit 38 calculates an index based on the information regarding the calculated fitting function. Specifically, the feature amount calculation unit 38 calculates an index based on (A) the coefficients of the fitting function, (B) the differences between the fitting function and the distribution information, etc.

(A) A case in which calculation is performed based on the coefficients of the fitting function will be described.

First, the feature amount calculation unit 38 calculates the coefficients of the fitting function. The coefficients co of the fitting function are co={c0, c1, ..., cn}. The coefficients co of the fitting function are calculated using Formula 1. Note that the coefficients co' of the reference fitting function are co'={c0', c1', ..., cn'}.

$$g(x)=\Sigma_{k=1}^{n}c_i x^i \qquad \text{[Formula 1]}$$

g(x): n-dimensional polynomial
$c_0, c_1, \ldots, c_n$: coefficients of fitting function
x: first index information Subsequently, the feature amount calculation unit 38 calculates an inter-vector distance or inter-vector similarity using a coefficient vector of the fitting function and a reference coefficient vector of the reference fitting function, and sets the inter-vector distance or inter-vector similarity as a feature amount. The coefficient vector is generated using the above-described coefficients co. The reference coefficient vector is generated using the above-described coefficients co'.

As the inter-vector distance, the weighted Minkowski distance, the Euclidean distance, the Chebyshev distance, etc., are conceivable, for example. Furthermore, as the inter-vector similarity, a value obtained by subtracting a typical inter-vector similarity (such as the cosine similarity) from a constant, an exponential function in which the exponent is a value obtained by multiplying a typical inter-vector similarity by −1, etc., are conceivable, for example.

(B) A case in which calculation is performed based on the differences between the fitting function and the distribution information will be described.

First, the feature amount calculation unit 38 calculates difference information using the fitting function and the distribution information. Specifically, the difference information is the sum of squared errors E. The sum of squared errors E is calculated using Formula 2. Furthermore, the feature amount calculation unit 38 calculates the reference sum of squared errors E' using the reference fitting function and the reference distribution information.

$$E=\Sigma_{j=1}^{N}(y_j-g(x_j))^2 \qquad \text{[Formula 2]}$$

N: number of events forming distribution information
$g(x_j)$: fitting function
$x_j$: first index information
$y_j$: second index information Subsequently, the feature amount calculation unit 38 calculates the amount or rate of change of the sum of squared errors E relative to the reference sum of squared errors E', and sets the result of the calculation as a feature amount.

However, the fitting function is not limited to the above-described function. Furthermore, the method for calculating a feature amount is not limited to the above-described methods.

The assessment unit 3 assesses the state of the bearing 23 based on the calculated feature amount. Specifically, the assessment unit 3 assesses that there is deterioration in or damage to the bearing 23 if the calculated feature amount is greater than a preset threshold Th.

If there is deterioration in or damage to the bearing 23, the response characteristic of the bearing to an external force changes. Also, if the response characteristic of the bearing to an external force changes, the distribution information changes. Furthermore, if the distribution information changes, the slope of the regression line, the coefficients of the fitting function fitted using the distribution information, the difference information between the fitting function and the distribution information, etc., change, and thus such information can be used to assess whether or not there is deterioration in or damage to the bearing 23.

Figure 4:
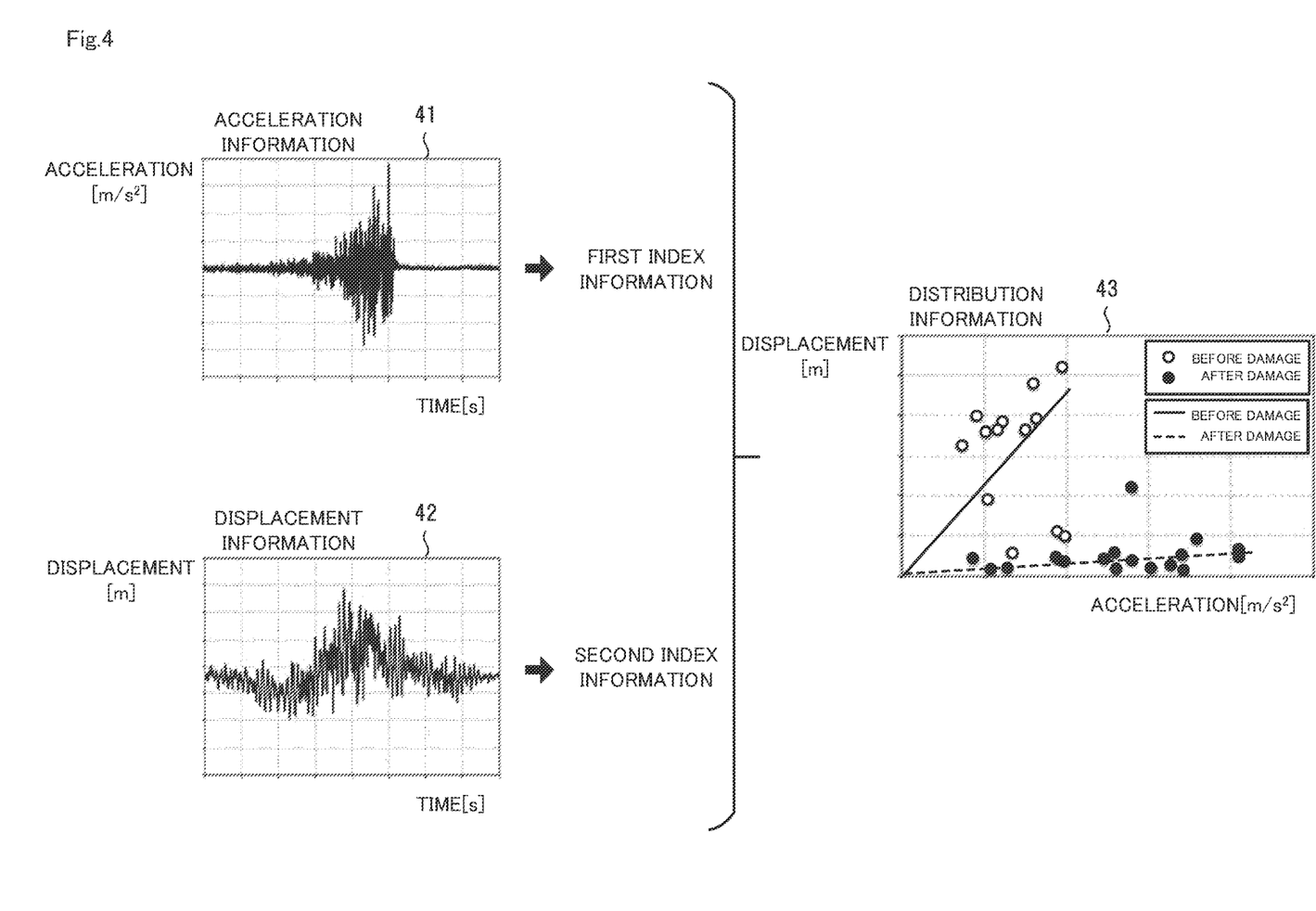
FIG. 4 is a diagram for describing the calculation of a feature amount.

As an example, images of the distribution information before and after damage and examples of regression lines are shown in graph 43 in FIG. 4. The solid line indicates the regression line before damage and the broken line indicates the regression line after damage. If the bearing 23 is damaged, the response characteristic of the bearing to an external force changes. Thus, the distribution information changes and the slope of the regression line changes. For example, if the bearing 23 is locked up and can no longer properly function in response to an external force, the ratio of the response of the bearing relative to an external force decreases. That is, the slope of the regression line decreases in graph 43.

The output information generation unit 39 acquires the assessment result from the feature amount calculation unit 38, and uses the assessment result to generate output information used to output the assessment result to the output apparatus 33. Subsequently, the output information generation unit 39 outputs the generated output information to the output apparatus 33.

[Modification]

A modification will be described. The above-described feature amount calculation unit 38 calculates the sum of squared errors E as difference information using the fitting function and the distribution information. However, in the modification, the feature amount calculation unit 38 calculates an error distribution as difference information. The above-described assessment unit 3 performs an assessment based on whether or not the calculated feature amount is greater than the threshold Th. However, in the modification, the assessment unit 3 uses the error distribution and assesses whether or not there is deterioration in or damage to the bearing based on statistical testing.

The feature amount calculation unit 38 calculates an error distribution Ej (j=1, 2, . . . , N) using the fitting function and the distribution information based on Formula 3, for example. Furthermore, the feature amount calculation unit 38 calculates a reference error distribution E'j (j=1, 2, . . . , N') using the reference fitting function and the reference distribution information. Note that the number of events N forming the error distribution Ej and the number of events N' forming the reference error distribution E'j do not necessarily have to match.

$$E_j = y_j - g(x_j), j=1,2, \ldots, N \quad \text{[Formula 3]}$$

$g(x_j)$: fitting function
$x_j$: first index information
$y_j$: second index information Subsequently, the feature amount calculation unit 38 calculates a test statistic as a feature amount based on the error distribution Ej and the reference error distribution E'j. Specifically, the feature amount calculation unit 38 calculates the U statistic in a Mann-Whitney U test or the like as a test statistic.

The assessment unit 3 assesses the state of the bearing 23 based on the feature amount calculated above. Specifically, the assessment unit 3 assesses that there is deterioration in or damage to the bearing 23 if the calculated feature amount is smaller than a preset threshold Thr. For example, the preset threshold Thr is a value adopted as the significance level in the statistical testing, or the like.

If there is deterioration in or damage to the bearing 23, the response characteristic of the bearing to an external force changes. If the response characteristic of the bearing to an external force changes, the distribution information changes. Furthermore, if the distribution information changes, difference information indicating the difference between the fitting function and the distribution information, etc., changes before and after the change. This being the case, if the error distribution, which is one type of difference information, changes, an assessment can be made as to whether or not there is deterioration in or damage to the bearing 23 using statistical testing between before and after the change.

However, the method in which the feature amount calculation unit 38 calculates the feature amount and the method in which the assessment unit 3 assesses deterioration in or damage to the bearing are not limited to the above-described methods.

[Apparatus Operations]

Figure 5:
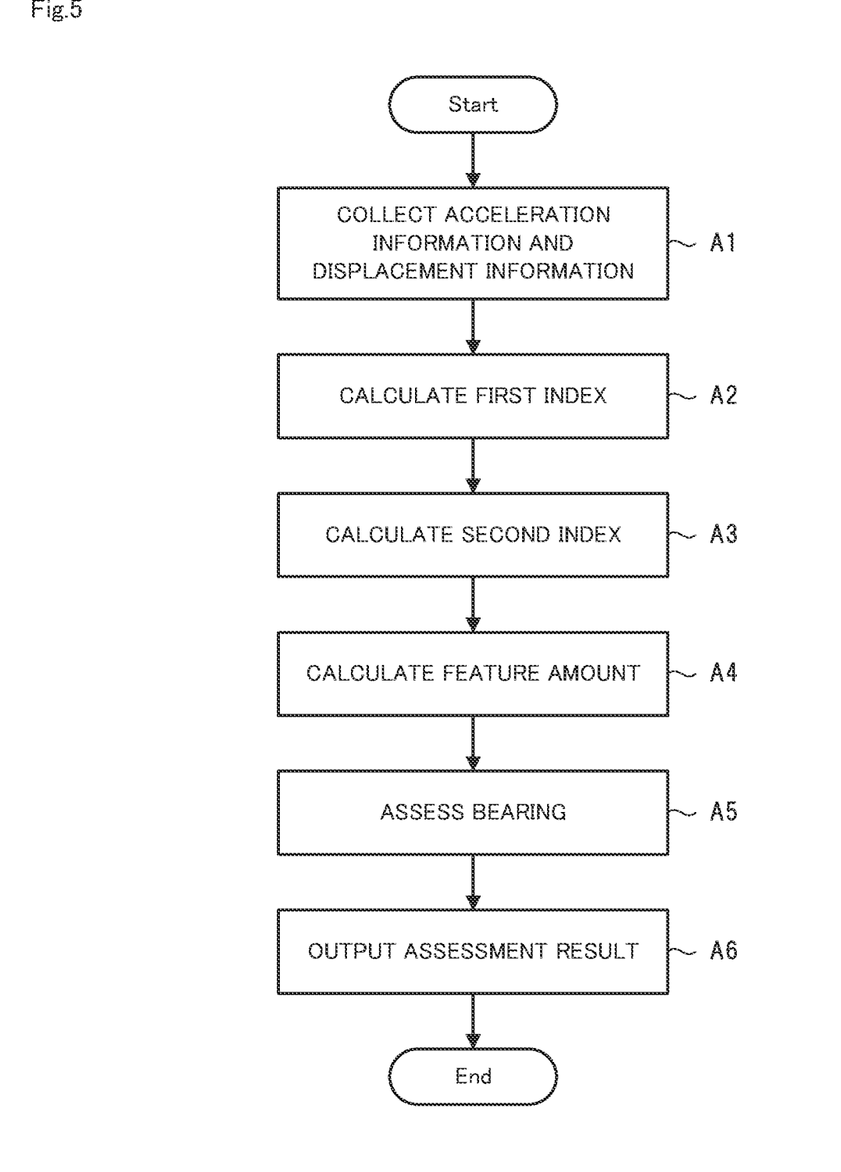
FIG. 5 is a diagram illustrating one example of operations of the bearing diagnosis apparatus.

Next, operations of the bearing diagnosis apparatus in the example embodiment of the invention will be described with reference to FIG. 5. FIG. 5 is a diagram illustrating one example of operations of the bearing diagnosis apparatus. FIGS. 2 to 4 will be referred to as needed in the following description. Furthermore, in the present example embodiment, a bearing diagnosis method is implemented by causing the bearing diagnosis apparatus to operate. Accordingly, the following description of the operations of the bearing diagnosis apparatus is substituted for the description of the bearing diagnosis method in the present example embodiment.

As illustrated in FIG. 5, first, the first collection unit 34 collects acceleration information from the first sensor 31 (step A1). Furthermore, the second collection unit 35 collects displacement information from the second sensor 32 (step A1).

Subsequently, the extraction unit 2 calculates first index information indicating a response of a structure 21 to an external force using the collected acceleration information (step A2). Furthermore, the extraction unit 2 calculates second index information indicating a response, to the external force, of a bearing 23 provided to the structure 21 using the collected displacement information (step A3). Note that steps A2 and A3 may be executed in the reverse order or in parallel.

Subsequently, the extraction unit 2 calculates a feature amount using the first index information and the second index information (step A4).

The assessment unit 3 assesses the state of the bearing 23 based on the calculated feature amount (step A5). Subsequently, the output information generation unit 39 uses the assessment result to generate output information to be used to output the assessment result to the output apparatus 33, and outputs the generated output information to the output apparatus 33 (step A6).

Step A1 will be described.

In step A1, the first collection unit 34 collects acceleration information indicating acceleration from the first sensor 31. Specifically, in step A1, the first collection unit 34 receives acceleration information indicating acceleration occurring in the superstructure 21 due to an external force each time an event occurs. Subsequently, the first collection unit 34 stores the acceleration information to the storage unit so as to be associated with information indicating an event. An image of acceleration information is shown in graph 41 in FIG. 4.

Furthermore, in step A1, the second collection unit 35 collects displacement information indicating displacement from the second sensor 32. Specifically, in step A1, the second collection unit 35 receives displacement information indicating displacement occurring in the bearing 23 due to an external force each time an event occurs. Subsequently, the second collection unit 35 stores the displacement information to the storage unit so as to be associated with information indicating an event. An image of displacement information is shown in graph 42 in FIG. 4.

In such a manner, information indicating an event, acceleration information, and displacement information can be stored so as to be associated with each other.

Step A2 will be described.

In step A2, the first index calculation unit 36 calculates first index information (index value of external force) indicating an acceleration response using acceleration information. Specifically, in step A2, the first index calculation unit 36 first acquires acceleration information from the first collection unit 34.

Subsequently, the first index calculation unit 36 calculates a root mean square (RMS) value within a predetermined period using the acceleration information, for example, and sets the RMS value as first index information. Alternatively, the first index calculation unit 36 detects the maximum amplitude value within the predetermined period using the acceleration information, and sets the maximum amplitude value as first index information. Alternatively, the first index calculation unit 36 performs double integration using the acceleration information within the predetermined period and detects the maximum amplitude value from the result of the double integration, and sets the maximum amplitude value as first index information. However, the method to be used to calculate first index information is not limited to those described above.

Subsequently, the first index calculation unit 36 stores the first index information to the storage unit so as to be associated with information indicating an event. The predetermined period for calculating first index information is to be determined through experimentation, simulation, or the like, for example.

Step A3 will be described.

In step A3, the second index calculation unit 37 calculates second index information indicating a displacement response using displacement information. Specifically, in step A3, the second index calculation unit 37 first acquires displacement information from the second collection unit 35.

Subsequently, the second index calculation unit 37 detects the maximum amplitude value within a predetermined period using the displacement information, for example, and sets the maximum amplitude value as second index information. However, the method to be used to calculate second index information is not limited to that described above. Subsequently, the second index calculation unit 37 stores the second index information to the storage unit so as to be associated with information indicating an event. The predetermined period for calculating second index information is to be determined through experimentation, simulation, or the like, for example.

Step A4 will be described.

In step A4, the feature amount calculation unit 38 extracts a feature amount indicating the correlation between first index information and second index information using first index information and second index information. Specifically, in step A4, the feature amount calculation unit 38 first acquires first index information from the first index calculation unit 36. Furthermore, the feature amount calculation unit 38 acquires second index information from the second index calculation unit 37.

Subsequently, the feature amount calculation unit 38 calculates a feature amount based on generated distribution information and reference distribution information. For example, the feature amount calculation unit 38 calculates a feature amount using (1) the slope of a regression line, (2) coefficients of a fitting function, (3) errors from the fitting function, or the like.

(1) A case in which the slope of a regression line is used will be described.

In step A4, the feature amount calculation unit 38 executes regression analysis processing using the generated distribution information, and calculates the slope r of the regression line. Furthermore, the feature amount calculation unit 38 executes regression analysis processing using the reference distribution information, and calculates the reference slope rb of the regression line. Subsequently, the feature amount calculation unit 38 calculates the amount or rate of change of the slope r relative to the reference slope rb, and sets the result of the calculation as a feature amount.

(2) A case in which coefficients of a fitting function are used will be described.

In step A4, the feature amount calculation unit 38 calculates an index based on information regarding a fitting function fitted using the generated distribution information and information regarding a reference fitting function fitted using the reference distribution information.

Specifically, in step A4, the feature amount calculation unit 38 first calculates a fitting function that fits the distribution information. For example, a polynomial function or the like is used as the fitting function. Note that, as the method for generating the above-described fitting function, it is conceivable to use the least-squares method, the maximum likelihood estimation method, etc.

Subsequently, the feature amount calculation unit 38 calculates an index based on the information regarding the calculated fitting function. Specifically, the feature amount calculation unit 38 calculates an index based on (A) the coefficients of the fitting function, (B) the differences between the fitting function and the distribution information, etc.

(A) A case in which calculation is performed based on the coefficients of the fitting function will be described.

In step A4, the feature amount calculation unit 38 first calculates the coefficients of the fitting function. The coefficients co of the fitting function are co={c0, c1, . . . , cn}. The coefficients co of the fitting function are calculated using Formula 1. Note that the coefficients co' of the reference fitting function are co'={c0', c1', . . . , cn'}.

Subsequently, the feature amount calculation unit 38 calculates an inter-vector distance or inter-vector similarity using a coefficient vector of the fitting function and a reference coefficient vector of the reference fitting function, and sets the inter-vector distance or inter-vector similarity as a feature amount. The coefficient vector is generated using the above-described coefficients co. The reference coefficient vector is generated using the above-described coefficients co'.

As the inter-vector distance, the weighted Minkowski distance, the Euclidean distance, the Chebyshev distance, etc., are conceivable, for example. Furthermore, as the inter-vector similarity, a value obtained by subtracting a typical inter-vector similarity (such as the cosine similarity) from a constant, an exponential function in which the exponent is a value obtained by multiplying a typical inter-vector similarity by −1, etc., are conceivable, for example.

(B) A case in which calculation is performed based on the differences between the fitting function and the distribution information will be described.

In step A4, the feature amount calculation unit 38 first calculates difference information using the fitting function and the distribution information. Specifically, the difference information is the sum of squared errors E. The sum of squared errors E is calculated using Formula 2. Furthermore, the feature amount calculation unit 38 calculates the reference sum of squared errors E' using the reference fitting function and the reference distribution information.

Subsequently, the feature amount calculation unit 38 calculates the amount or rate of change of the sum of squared errors E relative to the reference sum of squared errors E', and sets the result of the calculation as a feature amount.

However, the fitting function is not limited to the above-described function. Furthermore, the method for calculating a feature amount is not limited to the above-described methods.

Step A5 will be described.

In step A5, the assessment unit 3 assesses the state of the bearing 23 based on the calculated feature amount. Specifically, in step A5, the assessment unit 3 assesses that there is deterioration in or damage to the bearing 23 if the calculated feature amount is greater than a preset threshold Th.

If there is deterioration in or damage to the bearing 23, the response characteristic of the bearing to an external force changes. If the response characteristic of the bearing to an external force changes, the distribution information changes. If the distribution information changes, the slope of the regression line, the coefficients of the fitting function fitted using the distribution information, difference information between the fitting function and the distribution information, etc., change, and thus such information can be used to assess whether or not there is deterioration in or damage to the bearing 23.

As an example, images of the distribution information before and after damage and examples of regression lines are shown in graph 43 in FIG. 4. The solid line indicates the regression line before damage and the broken line indicates the regression line after damage. If the bearing 23 is damaged, the response characteristic of the bearing to an external force changes. Thus, the distribution information changes and the slope of the regression line changes. For example, if the bearing 23 is locked up and can no longer properly function in response to an external force, the ratio of the response of the bearing relative to an external force decreases. That is, the slope of the regression line decreases in graph 43.

Step A6 will be described.

In step A6, the output information generation unit 39 acquires the assessment result from the feature amount calculation unit 38, and uses the assessment result to generate output information used to output the assessment result to the output apparatus 33. Subsequently, the output information generation unit 39 outputs the generated output information to the output apparatus 33.

[Modification]

A modification will be described. In above-described step A4, the feature amount calculation unit 38 calculates the sum of squared errors E as difference information using the fitting function and the distribution information. However, in the modification, the feature amount calculation unit 38 calculates an error distribution as difference information. The above-described assessment unit 3 performs an assessment based on whether or not the calculated feature amount is greater than the threshold Th. However, in the modification, the assessment unit 3 uses the error distribution and assesses whether or not there is deterioration in or damage to the bearing based on statistical testing.

In step A4, the feature amount calculation unit 38 calculates an error distribution $E_j$ (j=1, 2, ..., N) using the fitting function and the distribution information based on Formula 3, for example. Furthermore, the feature amount calculation unit 38 calculates a reference error distribution $E'_j$ (j=1, 2, ..., N') using the reference fitting function and the reference distribution information. Note that the number of events N forming the error distribution $E_j$ and the number of events N' forming the reference error distribution $E'_j$ do not necessarily have to match.

Subsequently, the feature amount calculation unit 38 calculates a test statistic as a feature amount based on the error distribution $E_j$ and the reference error distribution $E'_j$. Specifically, the feature amount calculation unit 38 calculates the U statistic in a Mann-Whitney U test or the like as a test statistic.

Subsequently, in step A5, the assessment unit 3 assesses the state of the bearing 23 based on the feature amount calculated above. Specifically, in step A5, the assessment unit 3 assesses that there is deterioration in or damage to the bearing 23 if the calculated feature amount is smaller than a preset threshold Thr. For example, the preset threshold Thr is a value adopted as the significance level in the statistical testing, or the like.

If there is deterioration in or damage to the bearing 23, the response characteristic of the bearing to an external force changes. If the response characteristic of the bearing to an external force changes, the distribution information changes. If the distribution information changes, difference information between the fitting function and the distribution information, etc., change before and after the change. If the error distribution, which is one type of difference information, changes, an assessment can be made as to whether or not there is deterioration in or damage to the bearing 23 using statistical testing between before and after the change.

However, the method in which the feature amount calculation unit 38 calculates the feature amount in step A4 and the method in which the assessment unit 3 assesses deterioration in or damage to the bearing in step A5 are not limited to the above-described methods.

Effects of Example Embodiment

As described above, according to the present example embodiment, the state of a bearing can be accurately diagnosed because the response of a structure to an external force and the response of the bearing to the external force are measured, a feature amount is calculated using information indicating the correlation between the measured responses, and the state of the bearing is assessed based on the calculated feature amount. Thus, erroneous assessments can be reduced.

[Program]

It suffices for a program in the example embodiment of the invention to be a program that causes a computer to carry out steps A1 to A6 illustrated in FIG. 5. By installing this program on a computer and executing the program, the bearing diagnosis apparatus and the bearing diagnosis method in the present example embodiment can be realized. In this case, the processor of the computer functions and performs processing as the first collection unit 34, the second collection unit 35, the extraction unit 2 (the first index calculation unit 36, the second index calculation unit 37, and the feature amount calculation unit 38), the assessment unit 3, and the output information generation unit 39.

Furthermore, the program in the present example embodiment may be executed by a computer system formed by a plurality of computers. In this case, the computers may each function as one of the first collection unit 34, the second collection unit 35, the extraction unit 2 (the first index calculation unit 36, the second index calculation unit 37, and the feature amount calculation unit 38), the assessment unit 3, and the output information generation unit 39, for example.

[Physical Configuration]

Figure 6:
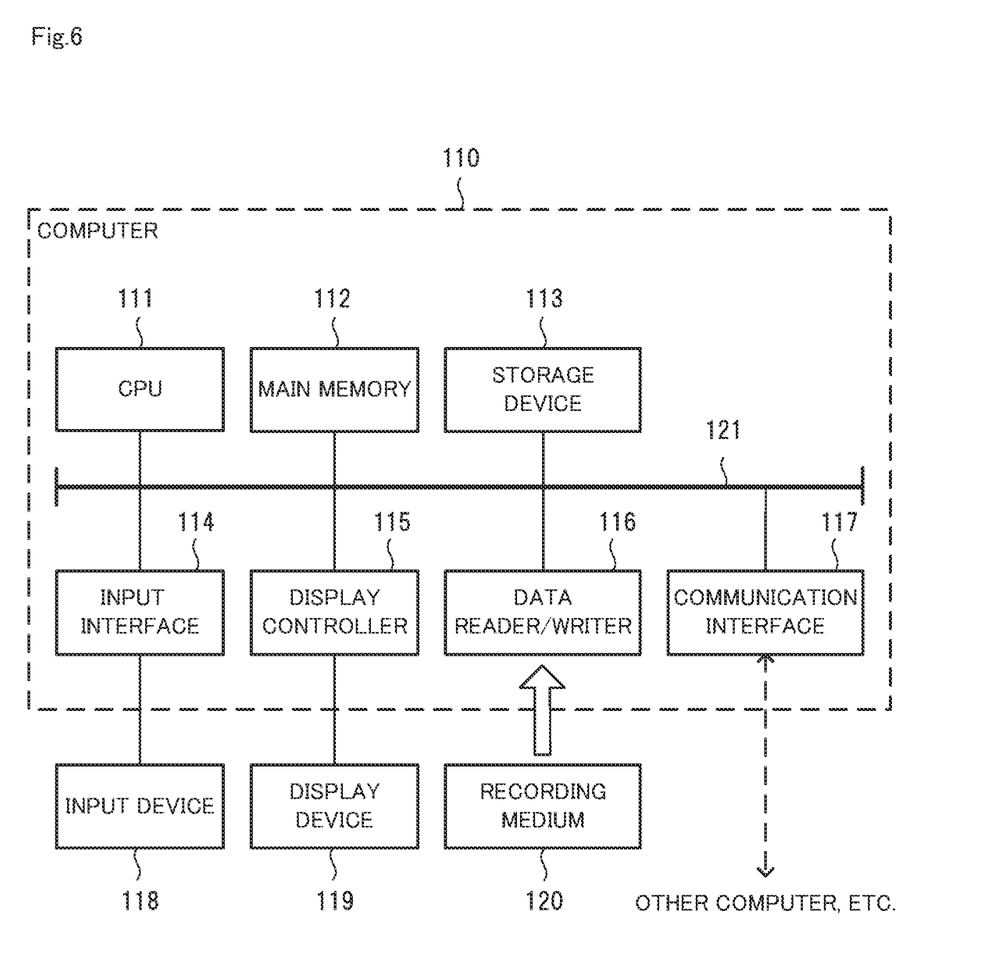
FIG. 6 is a diagram illustrating one example of a computer for realizing the bearing diagnosis apparatus.

Here, a computer that realizes the bearing diagnosis apparatus by executing the program in the example embodiment will be described with reference to FIG. 6. FIG. 6 is a block diagram illustrating one example of a computer for realizing the bearing diagnosis apparatus in the example embodiment of the invention.

As illustrated in FIG. 6, a computer 110 includes a CPU 111, a main memory 112, a storage device 113, an input interface 114, a display controller 115, a data reader/writer 116, and a communication interface 117. These components are connected via a bus 121 so as to be capable of performing data communication with one another. Note that the computer 110 may include a graphics processing unit (GPU) or a field-programmable gate array (FPGA) in addition to the CPU 111 or in place of the CPU 111.

The CPU 111 loads the program (codes) in the present example embodiment, which is stored in the storage device 113, onto the main memory 112, and performs various computations by executing these codes in a predetermined order. The main memory 112 is typically a volatile storage device such as a dynamic random access memory (DRAM). Furthermore, the program in the present example embodiment is provided in a state such that the program is stored in a computer readable recording medium 120. Note that the program in the present example embodiment may also be a program that is distributed on the Internet, to which the computer 110 is connected via the communication interface 117.

In addition, specific examples of the storage device 113 include semiconductor storage devices such as a flash memory, in addition to hard disk drives. The input interface 114 mediates data transmission between the CPU 111 and input equipment 118 such as a keyboard and a mouse. The display controller 115 is connected to a display device 119, and controls the display performed by the display device 119.

The data reader/writer 116 mediates data transmission between the CPU 111 and the recording medium 120, and executes the reading out of the program from the recording medium 120 and the writing of results of processing in the computer 110 to the recording medium 120. The communication interface 117 mediates data transmission between the CPU 111 and other computers.

Furthermore, specific examples of the recording medium 120 include a general-purpose semiconductor storage device such as a CompactFlash (registered trademark, CF) card or a Secure Digital (SD) card, a magnetic recording medium such as a flexible disk, and an optical recording medium such as a compact disk read-only memory (CD-ROM).

[Supplementary Note]

In relation to the above example embodiment, the following Supplementary notes are further disclosed. While a part of or the entirety of the above-described example embodiment can be expressed by (Supplementary note 1) to (Supplementary note 11) described in the following, the invention is not limited to the following description.

(Supplementary Note 1)
  A bearing diagnosis apparatus including:
    an extraction unit configured to extract a feature amount using first index information indicating a response of a structure to an external force and second index information indicating a response, to the external force, of a bearing provided to the structure; and
    an assessment unit configured to assess the state of the bearing based on the extracted feature amount.

(Supplementary Note 2)
  The bearing diagnosis apparatus according to Supplementary note 1, wherein
    the feature amount is information indicating the correlation between the first index information and the second index information.

(Supplementary Note 3)
  The bearing diagnosis apparatus according to Supplementary note 1 or 2, wherein
    the first index information is an index indicating an acceleration response calculated using acceleration measured by a first sensor provided to the structure, and
    the second index information is an index indicating a displacement response calculated using displacement measured by a second sensor that measures the displacement of the bearing.

(Supplementary Note 4)
  The bearing diagnosis apparatus according to Supplementary note 3, wherein
    the first sensor is installed to a superstructure of bridge, and is installed at a position that is separated from the position of the bearing or the second sensor by a predetermined distance and where the first sensor does not come in contact with the bearing and the second sensor.

(Supplementary Note 5)
  A bearing diagnosis method including:
    an extraction step of extracting a feature amount using first index information indicating a response of a structure to an external force and second index information indicating a response, to the external force, of a bearing provided to the structure; and
    an assessment step of assessing the state of the bearing based on the extracted feature amount.

(Supplementary Note 6)
  The bearing diagnosis method according to Supplementary note 5, wherein
    the feature amount is information indicating the correlation between the first index information and the second index information.

(Supplementary Note 7)
  The bearing diagnosis method according to Supplementary note 5 or 6, wherein
    the first index information is an index indicating an acceleration response calculated using acceleration measured by a first sensor provided to the structure, and
    the second index information is an index indicating a displacement response calculated using displacement measured by a second sensor that measures the displacement of the bearing.

(Supplementary Note 8)
  The bearing diagnosis method according to Supplementary note 7, wherein
    the first sensor is installed to a superstructure of bridge, and is installed at a position that is separated from the position of the bearing or the second sensor by a predetermined distance and where the first sensor does not come in contact with the bearing and the second sensor.

(Supplementary Note 9)
  A computer readable recording medium that includes recorded thereon a program including instructions that cause a computer to carry out:
    an extraction step of extracting a feature amount using first index information indicating a response of a structure to an external force and second index information indicating a response, to the external force, of a bearing provided to the structure; and
    an assessment step of assessing the state of the bearing based on the extracted feature amount.

(Supplementary Note 10)
  The computer readable recording medium according to Supplementary note 9, wherein
    the feature amount is information indicating the correlation between the first index information and the second index information.

(Supplementary Note 11)
  The computer readable recording medium according to Supplementary note 9 or 10, wherein
    the first index information is an index indicating an acceleration response calculated using acceleration measured by a first sensor provided to the structure, and
    the second index information is an index indicating a displacement response calculated using displacement measured by a second sensor that measures the displacement of the bearing.

The invention has been described with reference to an example embodiment above, but the invention is not limited to the above-described example embodiment. Within the scope of the invention, various changes that could be understood by a person skilled in the art could be applied to the configurations and details of the invention.

This application is based upon and claims the benefit of priority from Japanese application No. 2019-040050, filed on Mar. 5, 2019, the disclosure of which is incorporated herein in its entirety by reference.

INDUSTRIAL APPLICABILITY

As described above, according to the invention, the state of a bearing can be accurately diagnosed. The invention is useful in fields in which the states of bearings need to be diagnosed in constructions that have bearings, such as bridges.

REFERENCE SIGNS LIST

1 Bearing diagnosis apparatus
2 Extraction unit
3 Assessment unit
20 Bridge
21 Superstructure (structure)
22 Substructure
23 Bearing
31 First sensor
32 Second sensor
33 Output apparatus
34 First collection unit
35 Second collection unit
36 First index calculation unit
37 Second index calculation unit
38 Feature amount calculation unit
39 Output information generation unit
110 Computer
111 CPU
112 Main memory
113 Storage device
114 Input interface
115 Display controller
116 Data reader/writer
117 Communication interface
118 Input equipment
119 Display device
120 Recording medium
121 Bus

The invention claimed is:

1. A system comprising:
a plurality of first sensors that are each configured to be installed under a superstructure of a bridge, a first sensor of the plurality of first sensors to measure acceleration of displacement of the superstructure of the bridge due to an external force being applied to the superstructure of the bridge;
a plurality of second sensors that are each configured to be installed under the superstructure of the bridge and on a corresponding substructure of the bridge, a second sensor of the plurality of second sensors to measure the displacement of the superstructure of the bridge due to the external force being applied to the superstructure of the bridge, by measuring a displacement of a corresponding bearing of a plurality of bearings, a corresponding bearing between the superstructure of the bridge and the corresponding substructure of the bridge,
wherein each first sensor of the plurality of first sensors is installed at a position separated from a position of a corresponding second sensor of the plurality of second sensors or the corresponding bearing of the corresponding second sensor of the plurality of second sensors by a predetermined distance, and such that the first sensor of the plurality of first sensors does not come into contact with the corresponding bearing and does not come into contact with the corresponding second sensor of the plurality of second sensors,
wherein one first sensor of the plurality of first sensors and the corresponding second sensor of the plurality of second sensors of the one first sensor are installed at an entrance side of the superstructure of the bridge, such that the one first sensor of the plurality of first sensors is more interior relative to the superstructure of the bridge than the corresponding second sensor of the plurality of sensors, and
wherein another first sensor of the plurality of first sensors and the corresponding second sensor of the plurality of second sensors of the another first sensor of the plurality of first sensors are installed at an exit side of the superstructure of the bridge, such that the another first sensor of the plurality of first sensors is more interior relative to the superstructure of the bridge than the corresponding second sensor of the plurality of second sensors;
at least one main memory storing instructions; and
at least one processor configured to execute the instructions to:
extract a feature amount using first index information and second index information,
wherein the feature amount is information indicating the correlation between the first index information and the second index information,
wherein the first index information indicates an acceleration response of the superstructure of the bridge due to the external force being applied to the superstructure of the bridge, the acceleration response calculated using the acceleration of displacement of the superstructure of the bridge measured by the plurality of first sensors, and
wherein the second index information indicates a displacement response of the bearing due to the external force being applied to the superstructure of the bridge, the displacement response calculated using the displacement measured by the plurality of second sensors; and
assess a state of the plurality of bearings based on the feature amount.

2. A method performed by a computer of a system, wherein the system comprises:
a plurality of first sensors that are each configured to be installed under a superstructure of a bridge, a first sensor of the plurality of first sensors to measure acceleration of displacement of the superstructure of the bridge due to an external force being applied to the superstructure of the bridge;
a plurality of second sensors that are each configured to be installed under the superstructure of the bridge and on a corresponding substructure of the bridge, a second sensor of the plurality of second sensors to measure the displacement of the superstructure of the bridge due to the external force being applied to the superstructure of the bridge, by measuring a displacement of a corresponding bearing of a plurality of bearings, the corresponding bearing between the superstructure of the bridge and the corresponding substructure of the bridge, wherein each first sensor of the plurality of the first sensors is installed at a position separated from a position of a corresponding second sensor of the plurality of second sensors or the corresponding bearing of the corresponding second sensor of the plurality of second sensors by a predetermined distance, and such that the first sensor of the plurality of first sensors does not come into contact with the corresponding bearing and does not come into contact with the corresponding second sensor of the plurality of second sensors, wherein one first sensor of the plurality of first sensors and the corresponding second sensor of the plurality of second sensors of the one first sensor of the plurality of first sensors are installed at an entrance side of the superstructure of the bridge, such that the one first sensor of the plurality of first sensors is more interior relative to the superstructure of the bridge than the corresponding second sensor of the plurality of sensors, and wherein another first sensor of the plurality of first sensors and the corresponding second sensor of the plurality of second sensors of the another first sensor of the plurality of first sensors are installed at an exit side of the superstructure of the bridge, such that the another first sensor of the plurality of first sensors is more interior relative to the superstructure of the bridge than the corresponding second sensor of the plurality of second sensors, and wherein the method comprises:

extracting a feature amount using first index information and second index information, wherein the feature amount is information indicating correlation between the first index information and the second index information, wherein the first index information indicates an acceleration response of the superstructure of the bridge due to external force being applied to the superstructure of the bridge, the acceleration response calculated using the acceleration of displacement of the superstructure of the bridge measured by the plurality of first sensors, and wherein the second index information indicates a displacement response of the bearing due to the external force being applied to the superstructure of the bridge, the displacement response calculated using the displacement measured by the plurality of second sensors of the plurality of second sensors; and assessing a state of the plurality of bearings based on the feature amount.

3. A non-transitory computer readable recording medium storing a program executable by a computer, wherein the system comprises:

a plurality of first sensors that are each configured to be installed under a superstructure of a bridge, a first sensor of the plurality of first sensors to measure acceleration of displacement of the superstructure of the bridge due to an external force being applied to the superstructure of the bridge;

a plurality of second sensors that are each configured to be installed under the superstructure of the bridge and on a corresponding substructure of the bridge, a second sensor of the plurality of second sensors to measure the displacement of the superstructure of the bridge due to the external force being applied to the superstructure of the bridge, by measuring a displacement of a corresponding bearing of a plurality of bearings, the corresponding bearing between the superstructure of the bridge and the corresponding substructure of the bridge, wherein each first sensor of the plurality of first sensors is installed at a position separated from a position of a corresponding second sensor of the plurality of second sensors or the corresponding bearing of the corresponding second sensor of the plurality of second sensors by a predetermined distance, and such that the first sensor of the plurality of sensors does not come into contact with the corresponding bearing and does not come into contact with the corresponding second sensor of the plurality of second sensors, wherein one first sensor of the plurality of first sensors and the corresponding second sensor of the plurality of second sensors of the one first sensor of the plurality of first sensors are installed at an entrance side of the superstructure of the bridge, such that the one first sensor of the plurality of first sensors is more interior relative to the superstructure of the bridge than the corresponding second sensor of the plurality of second sensors, and wherein another first sensor of the plurality of first sensors and the corresponding second sensor of the plurality of second sensors of the another first sensor of the plurality of first sensors are installed at an exit side of the superstructure of the bridge, such that the another first sensor of the plurality of first sensors is more interior relative to the superstructure of the bridge than the corresponding second sensor of the plurality of second sensors, and wherein the processing comprises:

extracting a feature amount using first index information and second index information, wherein the feature amount is information indicating correlation between the first index information and the second index information, wherein the first index information indicates an acceleration response of the superstructure of the bridge due to the external force being applied to the superstructure of the bridge, the acceleration response calculated using the acceleration of displacement of the superstructure of the bridge measured by the plurality of first sensors, and wherein the second index information indicates a displacement response of the bearing due to the external force being applied to the superstructure of the bridge, the displacement response calculated using the displacement of the superstructure of the bridge measured by the plurality of second sensors; and assessing a state of the plurality bearings based on the feature amount.

4. The system according to claim 1, wherein each second sensor of the plurality of second sensors is a non-contact displacement sensor that measures the displacement of the superstructure of the bridge in either or both of a horizontal direction and a vertical direction.

5. The system according to claim 1, wherein the at least one processor is configured to execute the instructions to further: generate distribution information from the first and second index information, and calculates; calculate a slope in a regression line, or coefficients of a fitting function, or an error with respect to the fitting function; and calculate features of the bridge using the calculated slope, coefficients, or error.

* * * * *